United States Patent
Trujillo

(10) Patent No.: US 12,117,110 B2
(45) Date of Patent: Oct. 15, 2024

(54) RV SEPTIC CLEANER

(71) Applicant: Trevor Ned Trujillo, Sheridan, WY (US)

(72) Inventor: Trevor Ned Trujillo, Sheridan, WY (US)

( * ) Notice: Subject to any disclaimer, the term of this patent is extended or adjusted under 35 U.S.C. 154(b) by 14 days.

(21) Appl. No.: 18/050,391

(22) Filed: Oct. 27, 2022

(65) Prior Publication Data
US 2023/0147747 A1 May 11, 2023

Related U.S. Application Data

(60) Provisional application No. 63/278,246, filed on Nov. 11, 2021.

(51) Int. Cl.
*F16L 41/02* (2006.01)
*F16L 33/24* (2006.01)
*E03F 1/00* (2006.01)

(52) U.S. Cl.
CPC ............ *F16L 33/24* (2013.01); *F16L 41/021* (2013.01); *E03F 1/008* (2013.01)

(58) Field of Classification Search
CPC ....... F16L 41/021; F16L 41/025; F16L 41/03; F16L 39/02; E03F 1/008; C02F 1/001; C02F 2103/005; C02F 2201/008; C02F 2201/004
See application file for complete search history.

(56) References Cited

U.S. PATENT DOCUMENTS

| | | | |
|---|---|---|---|
| 3,060,956 A | * | 10/1962 | Menzie ............... A01K 7/02 239/365 |
| 4,387,750 A | | 6/1983 | McNerney |
| 4,550,453 A | | 11/1985 | Norman |
| 6,006,766 A | | 12/1999 | Soulages |
| 7,112,276 B2 | | 9/2006 | Holler |
| 7,384,005 B1 | | 6/2008 | Caine et al. |

* cited by examiner

*Primary Examiner* — Aaron M Dunwoody

(57) ABSTRACT

The T-head coupler is intended to perform a cleaning-in-place of a blackwater tank inside a recreational vehicle, using a mixture of water and a cleaning agent. To accomplish this, the device includes a unique arrangement of ports and distribution channels, wherein the ports on the device are designed specifically to couple with ports commonly found in RVs and water sources. In addition, a container filled with a cleaning agent is attached to the bottom port on the device. When all attachments are made, a plurality of channels within the device direct incoming water to the container. The water mixes with the cleaning agent inside the container, forming a cleaning solution. The cleaning solution flows out of the device, using the pressure from the water source. The cleaning solution then flows from the RV port and into the blackwater tank, thereby cleaning the tank.

9 Claims, 8 Drawing Sheets

RV SEPTIC CLEANER

FIELD OF THE INVENTION

The present invention generally relates to a cleaning attachment that facilitates cleaning-in-place (CIP) of a blackwater tank in a recreational vehicle (RV). More specifically, the present invention is a T-head coupler, designed to mix water with a cleaning agent in a pressurized container. The combined mixture fills and cleans the blackwater tank.

BACKGROUND OF THE INVENTION

Recreational vehicles (RVs) are a cost effective, fun and efficient way to live and travel. Approximately a million Americans live in RVs full-time, however the total number of Americans who own and use an RV is closer to forty million. For the average RV user who does not live full-time in their RV, the time spent in their RV is anywhere between three to four weeks.

The various needs, adjustments and arrangement of the RV may vary with respect to the amount of use it experiences. For instance, an RV has a blackwater tank and a grey water tank. The blackwater tank holds human-waste and toilet paper from the RV toilet. The blackwater tank holds the waste until it is dumped into a RV dumping station.

As one could imagine, the more use the RV gets, the more use the blackwater tank gets. Thus, it is important to perform a cleaning-in-place (CIP) of the blackwater tank. This is performed by filling the blackwater tank with a mixture of water and a cleaning agent. The blackwater tank is then drained and one can repeat the process as many times as needed. The current way to clean a black holding tank is by hooking up a garden hose to the black tank clean out. Thus, cleaning the inside of the tank with only water. Although this approach is an okay solution, there is room for improvement. Therefore, the present invention aims to provide a better and more efficient way of performing a CIP of the blackwater tank inside an RV.

SUMMARY

It is an aim of the present invention to perform a cleaning-in-place of a blackwater tank inside an RV, using a mixture of water and a cleaning agent. The present invention comprises a T-head coupler with an integrated grab ring located on the inlet port. The grab ring swivels in place and is used to connect a water supply. Specifically, the user attaches a free end of a water hose to the inlet port of the T-head coupler and tightens the grab ring to the water hose. On the opposite end, the user attaches a free end of an RV hose to the outlet port of the T-head coupler. The other end of the RV hose is connected to the blackwater tank. Finally, the user attaches a bottle containing a cleaning agent to the bottom port of the T-head coupler.

Once all ports are connected, the user opens the faucet valve, thereby allowing water to flow into a series of channels within the T-head coupler. Specifically, the water enters from the inlet port and exits out through an aperture located at the bottom port. Inside the bottle, water mixes with the cleaning agent, forming a cleaning solution. During this time, water continues to fill the bottle until it is full and pressurized. This, in turn, forces the cleaning solution out through a second aperture located at the bottom port. The cleaning solution flows through a second series of channels, which directs the cleaning solution from the bottom port to the outlet port and finally, into the blackwater tank. Once inside the blackwater tank, the cleaning solution performs a CIP.

DETAIL DESCRIPTIONS OF THE INVENTION

All illustrations of the drawings are for the purpose of describing selected versions of the present invention and are not intended to limit the scope of the present invention.

Figure 1:
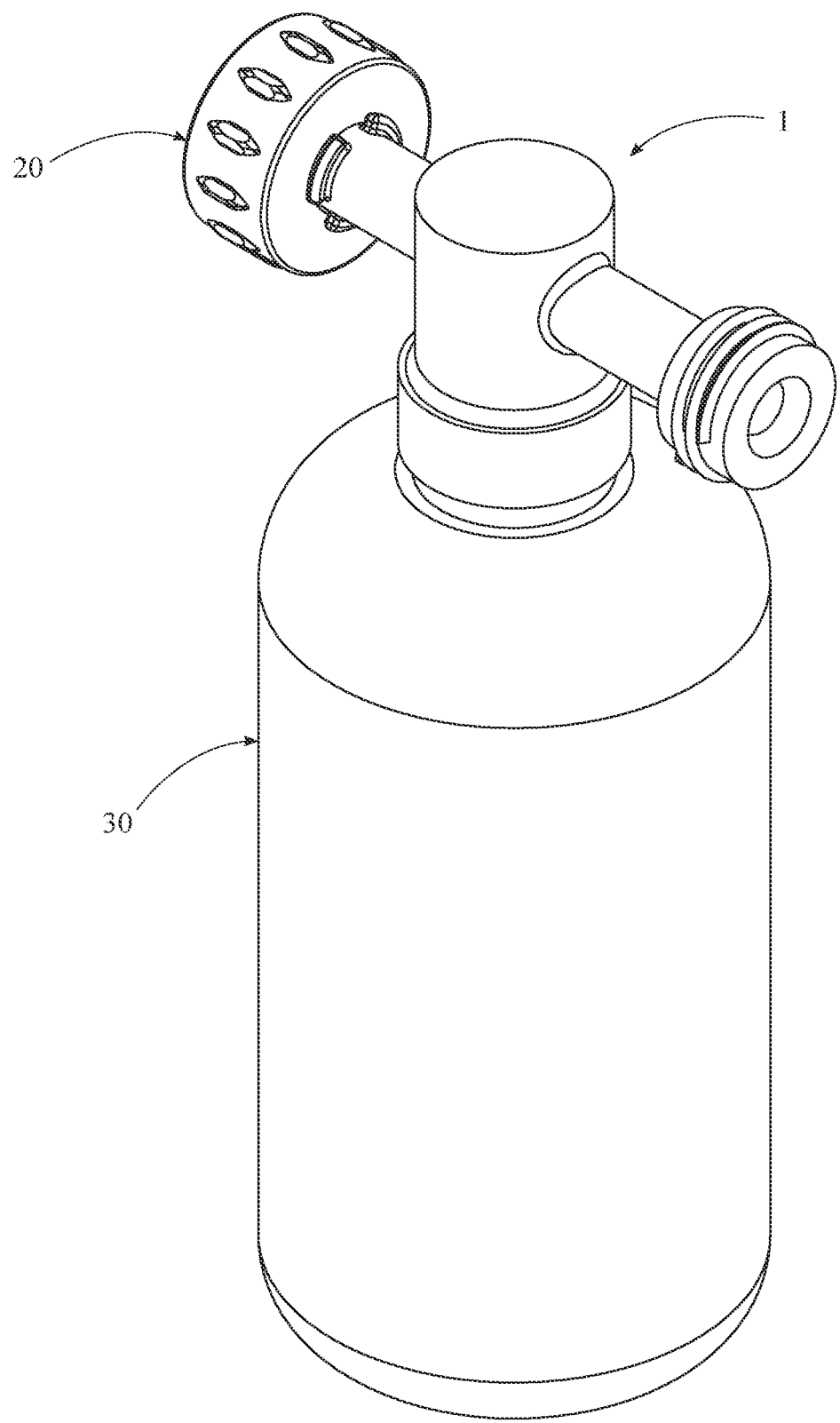
FIG. 1 is a top-front perspective view of the present invention, showing a mixing bottle attached.
Figure 2:
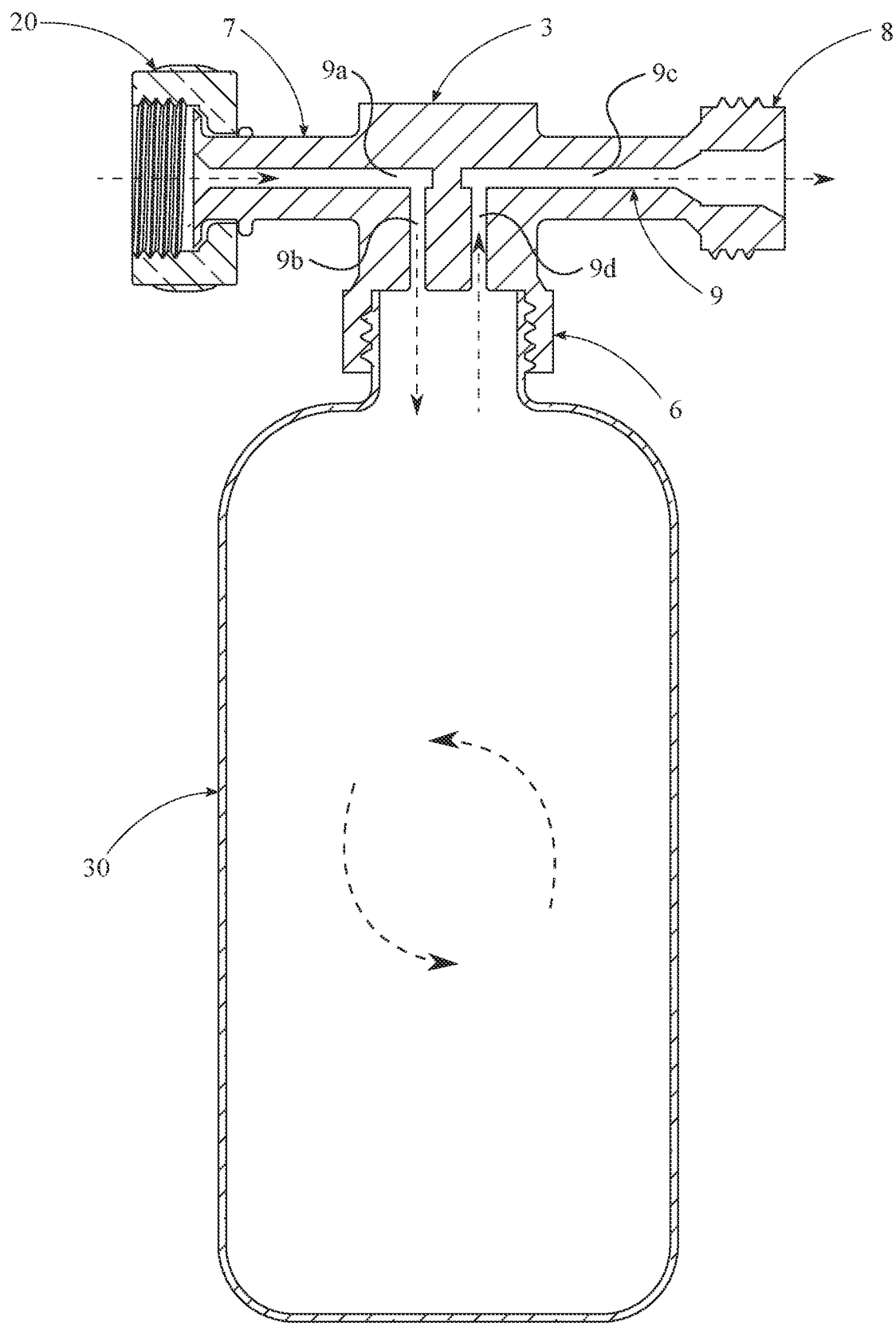
FIG. 2 is a front cross-sectional view of the present invention, showing a mixing bottle attached.

In reference to FIG. 1 and FIG. 2, the present invention is a T-head coupler designed to perform a CIP of a blackwater tank inside an RV. The present invention comprises a main body 1 and a grab ring 20. The grab ring 20 is centrally located along an inlet port 7 of the main body 1. A free end of a water hose is connected to the inlet port 7, via the grab ring 20. The other end of the water hose is connected to a faucet. The grab ring 20 engages with corresponding threads on the free end of the water hose, allowing the user to tighten the grab ring 20 by hand until the free end of the water hose is properly secured to the inlet port 7. On the opposite end of the main body 1, a free end of an RV hose is connected to an outlet port 8. The other end of the RV hose is connected to the blackwater tank of the RV. For proper cleaning of the blackwater tank, the water from the water hose must be mixed with a cleaning agent (e.g., soap). To perform this function, a mixing bottle 30 is attached to a central port 3, via a bottom connector 6. The mixing bottle 30 can be of any type and size suitable for connecting to the corresponding threads on the bottom connector 6. Additionally, the mixing bottle 30 can be pre-filled with any type of cleaning agent suitable for cleaning the blackwater tank.

The main body 1 further comprises a central axis 2, a central port 3, a top surface 4, a bottom head 5, a bottom connector 6, an inlet port 7, an outlet port 8, and a plurality of distribution channels 9. As best seen in FIG. 1 and FIG. 2, the main body 1 functions as the primary structural component of the present invention, as the remaining components of the present invention are configured upon the main body 1. The plurality of distribution channels 9 comprises a first channel 9a, a second channel 9b, a third channel 9c, a fourth channel 9d, and a spacing 9e. When all external attachments are fully connected to their corresponding ports (e.g., water hose to inlet port 7), the plurality of distribution channels 9 direct the flow of water and cleaning solution throughout the main body 1. In particular, incoming water flows from the inlet port 7 to the central port 3, via the first channel 9a and the second channel 9b. The water then enters the mixing bottle 30, wherein the water and cleaning agent are mixed to form a cleaning solution. Water continues to fill the mixing bottle 30 until the mixing bottle 30 is full and pressurized with the cleaning solution. The cleaning solution then flows back into the central port 3, via the third channel 9c and the fourth channel 9d, and into the outlet port 8. The cleaning solution then exits the outlet port 8 and enters the free end of an RV hose, where it is distributed throughout the blackwater tank.

Figure 3:
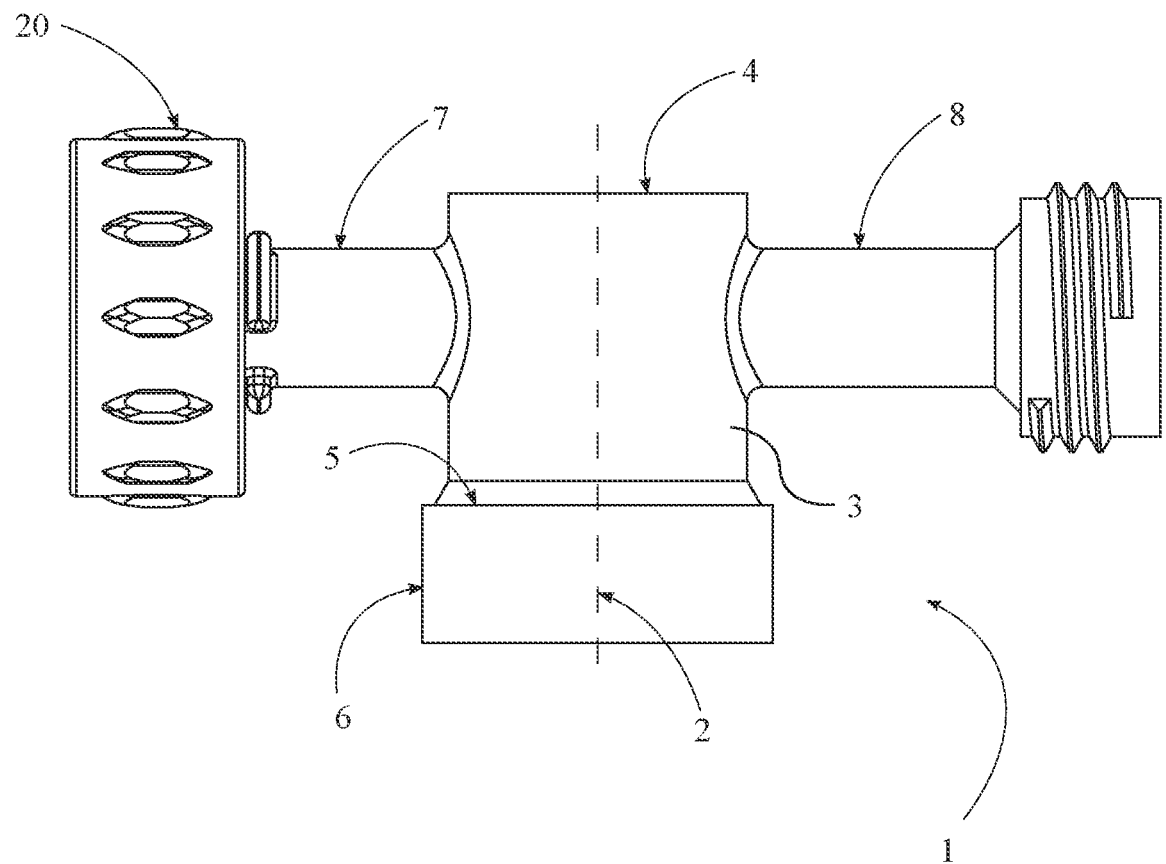
FIG. 3 is a front elevational view of the present invention.

As best seen in FIG. 3, the central port 3 is circular in shape and extends longitudinally along the central axis 2, from the top surface 4 to the bottom head 5. The bottom connector 6 is terminally connected to the bottom head 5. This arrangement allows the mixing bottle 30 to removably attach to the bottom connector 6. Both the inlet port 7 and the outlet port 8 are terminally connected to the central port 3, near the top surface 4. More specifically, the inlet port 7 is perpendicular to the central port 3 and adjacent to the top surface 4. The outlet port 8 is positioned opposite to the inlet port 7.

Figure 4:
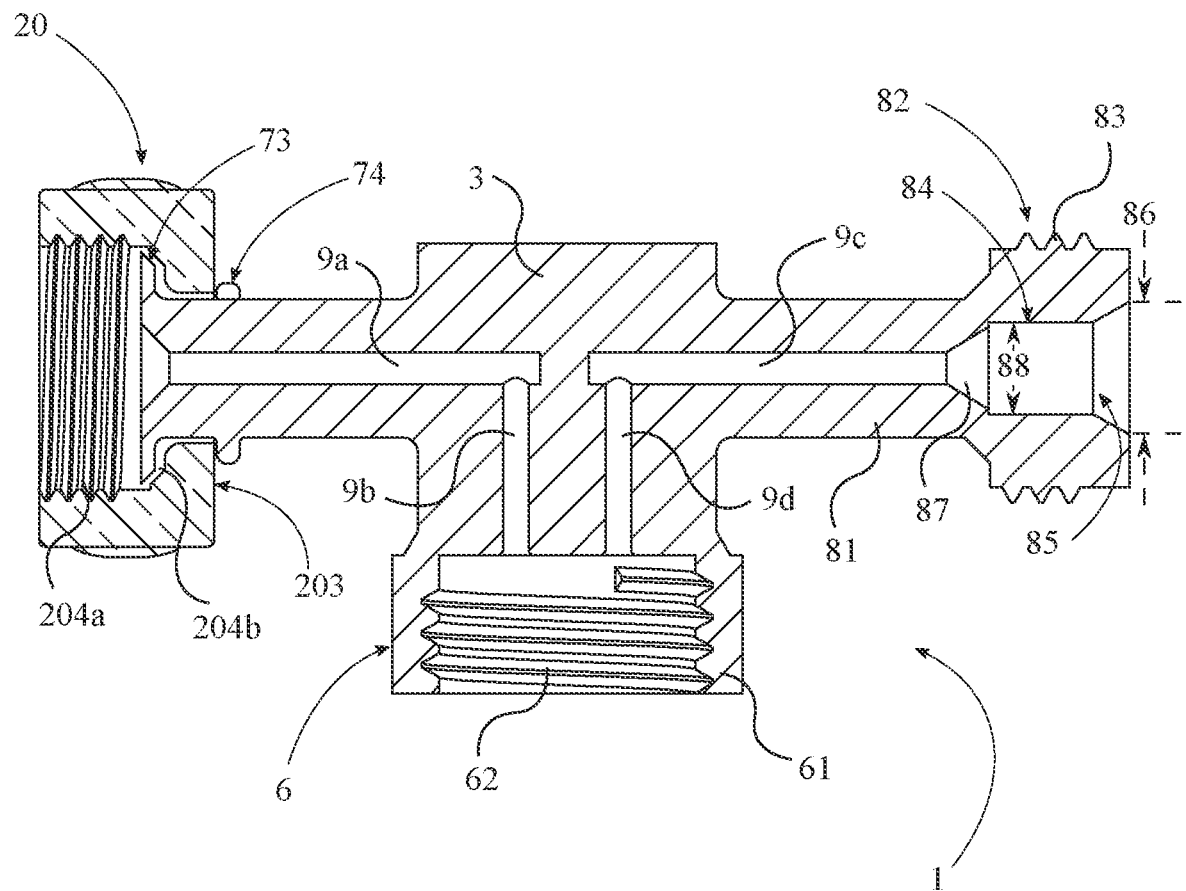
FIG. 4 is a front cross-sectional view of the present invention.
Figure 5:
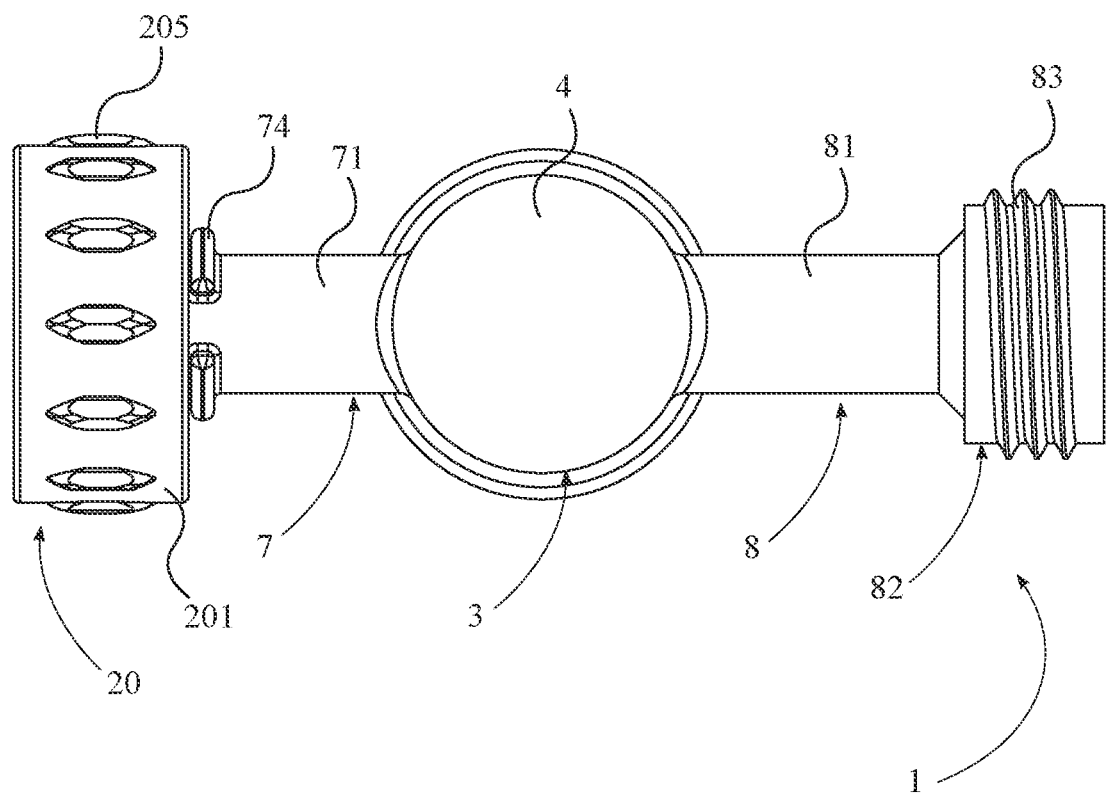
FIG. 5 is a is a top plan view of the present invention.
Figure 6:
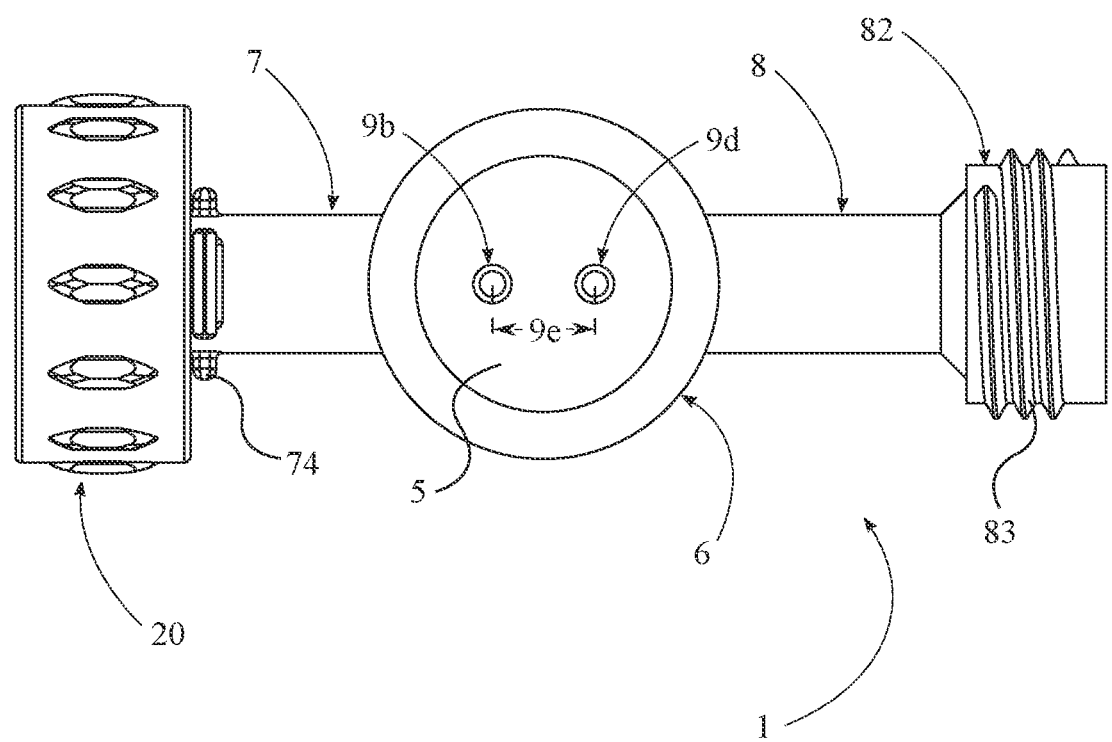
FIG. 6 is a is a bottom plan view of the present invention

As best seen in FIG. 4, the first channel 9a and the second channel 9b are in communication with each other. In particular, the first channel 9a traverses axially inward from the inlet port 7 into the central port 3. The second channel 9b is positioned perpendicular to the first channel 9a, and traverses from the first channel 9a to the bottom head 5. This arrangement directs water from the inlet port 7 to the bottom head 5. The third channel 9c and the fourth channel 9d are in communication with each other. Specifically, the third channel 9c traverses axially inward from the outlet port 8 into the central port 3. The fourth channel 9d is positioned perpendicular to the third channel 9c, and traverses from the third channel 9c to the bottom head 5. This arrangement directs cleaning solution from the bottom head 5 to the outlet port 8. As illustrated in FIG. 6, the spacing 9e between the second channel 9b and the fourth channel 9d at the bottom head 5 is delineated by a predefined length.

Figure 7:
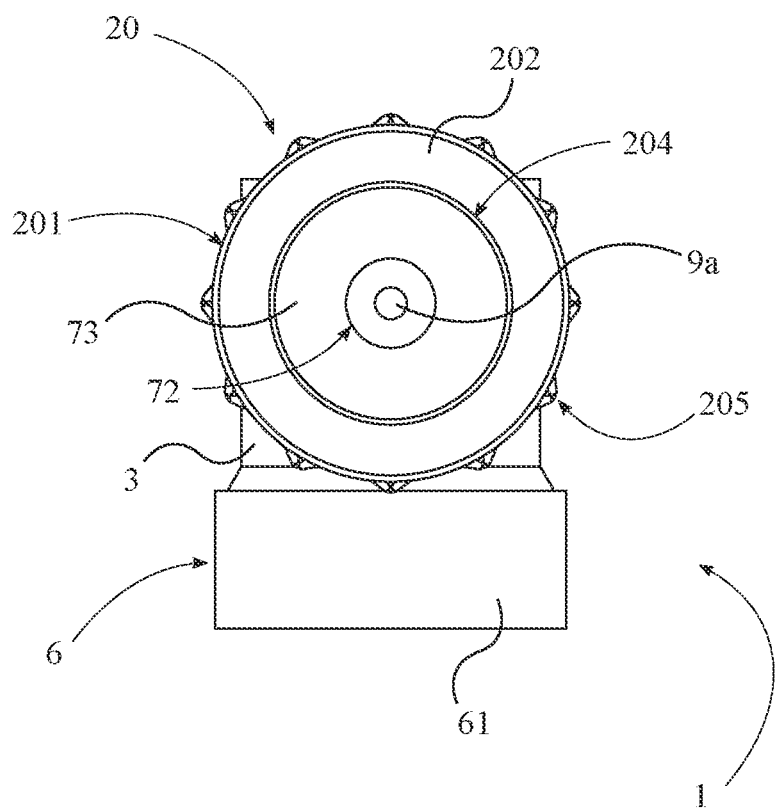
FIG. 7 is a left-side elevational view of the present invention.

In order to facilitate transporting water to the mixing bottle 30, the inlet port 7 comprises an inlet body 71, an inlet opening 72, an annular flange 73, and a plurality of retainers 74. As best seen in FIG. 4 and FIG. 7, The inlet body 71 extends outward from the central port 3 to the inlet opening 72. The inlet opening 72 is conically shaped and in communication with the first channel 9a. The annular flange 73 is adjacently connected to the inlet opening 72. This arrangement allows the free end of a water hose to press up against the annular flange 73. The grab ring 20 removably attaches to the free end of the water hose, thereby creating a secured connection between the inlet port 7 and the water hose. Once connected, water flows through the inlet opening 72 and into the central port 3, via the first channel 9a. The plurality of retainers 74 are perimetrically distributed about the inlet body 71. Specifically, each of the plurality of retainers 74 extends radially outward, positioned adjacent to the annular flange 73. This arrangement conveniently holds the grab ring 20 into position, preventing the grab ring 20 from sliding inward toward the central port 3.

Figure 8:
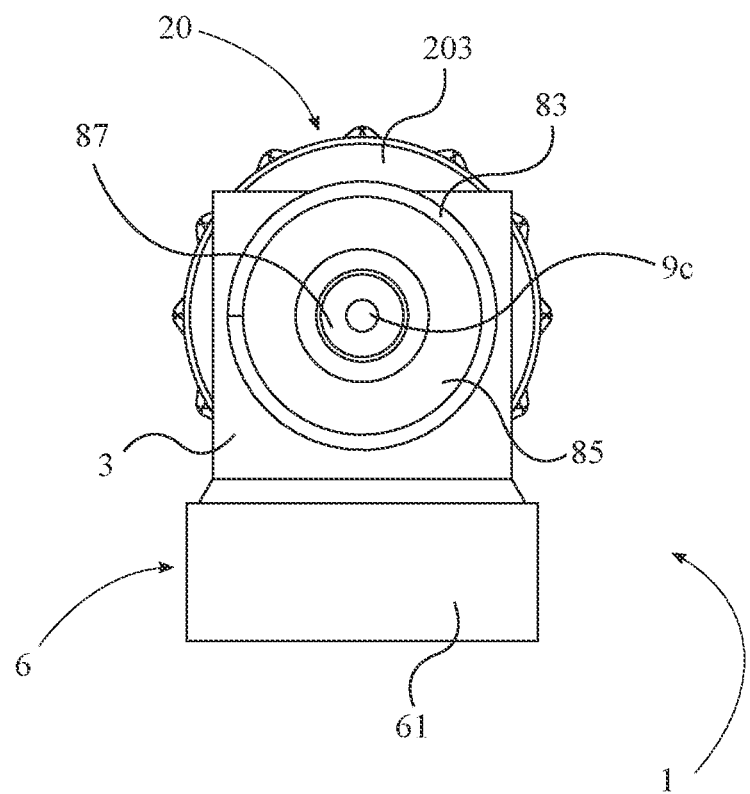
FIG. 8 is a right-side elevational view of the present invention.

In order to facilitate transporting cleaning solution to a blackwater tank of an RV, the outlet port 8 comprises an outlet body 81, an outlet connector 82, external threads 83, and an outlet opening 84. As best seen in FIG. 4 and FIG. 8, the outlet body 81 extends outward from the central port 3. The outlet connector 82 is terminally connected to the outlet body 81. The external threads 83 are perimetrically disposed about the outlet connector 82. This arrangement allows the threads of the free end of an RV hose to engage with the external threads 83 of the outlet connector 82, thereby securing the outlet port 8 to the RV hose. The outlet opening 84 traverses axially inward from the outlet connector 82. The outlet opening 84 is in communication with the third channel 9c. The outlet opening 84 further comprises a first opening 85, a first diameter 86, a second opening 87, and a second diameter 88. The first opening 85 is conically shaped and in communication with the second opening 87. The second opening 87 is conically shaped and in communication with the third channel 9c. The first diameter 86 of the first opening 85 is larger than the second diameter 88 of the second opening 87. This arrangement of smaller to larger openings within the outlet port 8 allows for smooth, uninterrupted flow of the cleaning solution as it exits the main body 1.

In order to effectively connect the free end of a water hose to the inlet port 7, the grab ring 20 comprises an outer surface 201, a front side 202, a rear side 203, an inner opening 204, and a plurality of ridges 205. As best seen in FIG. 4 and FIG. 7, the outer surface 201 is circular in shape and extends from the front side 202 to the rear side 203. The plurality of ridges 205 are perimetrically disposed along the outer surface 201. The outer surface 201 and the plurality of ridges 205 improve the ergonomic function of the grab ring 20, allowing the user to properly connect the water hose to the inlet port 7, without the need for hand tools (e.g., wrench). The inner opening 204 is axially aligned with the outer surface 201, and extends from the front side 202 to the rear side 203. The inner opening 204 further comprises a threaded portion 204a and an unthreaded portion 204b. The threaded portion 204a is disposed on the front side 202, and is defined by the thread profile on the free end of a water hose. The unthreaded portion 204b is disposed on the rear side 203, and is defined by the annular flange 73 and the inlet body 71. This arrangement allows the grab ring 20 to slide freely along the inlet port 7, but restricted in movement by the annular flange 73 and the plurality of retainers 74.

In order to effectively connect the mixing bottle 30 to the central port 3, the bottom connector 6 comprises a connector body 61 and internal threads 62. As best seen in FIG. 4, The internal threads 62 are perimetrically disposed within the connector body 61. The internal threads 62 are defined by the corresponding threads of the mixing bottle 30.

Although the invention has been explained in relation to its preferred embodiment, it is to be understood that many other possible modifications and variations can be made without departing from the spirit and scope of the invention.

What is claimed is:
1. A coupler comprising:
a main body;
a grab ring;
the main body comprising a central port, a top surface, a bottom head, a bottom connector, an inlet port, an outlet port, and a plurality of distribution channels;
the central port traversing from the top surface to the bottom head;
the bottom connector being terminally connected to the bottom head;
the inlet port being terminally connected to the central port;
the inlet port positioned perpendicular to the central port, adjacent to the top surface;
the grab ring being slidably engaged with the inlet port;
the outlet port being terminally connected to the central port;
the outlet port positioned opposite to the inlet port;
the plurality of distribution channels comprising a first channel, a second channel, a third channel, and a fourth channel;
the first channel being in communication with the second channel;

the first channel traversing from the inlet port to the central port;

the second channel traversing from the first channel to the bottom head;

the third channel being in communication with the fourth channel;

the third channel traversing from the outlet port to the central port;

the third channel not intersecting the first channel;

the fourth channel traversing from the third channel to the bottom head;

the inlet port comprising an inlet body, an inlet opening, an annular flange, and a plurality of retainers;

the inlet body extending outward from the central port to the inlet opening;

the inlet opening being in communication with the first channel;

the annular flange being connected adjacent to the inlet opening;

the plurality of retainers being perimetrically distributed about the inlet body;

the outlet port comprising an outlet body, an outlet connector, external threads, and an outlet opening;

the outlet body extending outward from the central port;

the outlet connector being terminally connected to the outlet body;

the external threads being perimetrically disposed about the outlet connector;

the outlet opening traversing axially inward from the outlet connector;

the outlet opening being in communication with the third channel;

the outlet opening comprising a first opening, a first diameter, a second opening, and a second diameter;

the first opening being conically shaped and in communication with the second opening;

the second opening being conically shaped and in communication with the third channel; and the first diameter of the first opening being larger than the second diameter of the second opening.

2. The coupler as claimed in claim 1 comprising:

the grab ring comprising an outer surface, a front side, a rear side, an inner opening, and a plurality of ridges;

the outer surface extending from the front side to the rear side;

the outer surface being circular in shape;

the plurality of ridges being perimetrically disposed about the outer surface;

the inner opening extending from the front side to the rear side; and the inner opening being axially aligned with the outer surface.

3. The coupler as claimed in claim 2 comprising:

the inner opening comprising a threaded portion and an unthreaded portion;

the threaded portion being perimetrically disposed on the front side;

the unthreaded portion being disposed on the rear side; and the unthreaded portion being defined by the annular flange and the inlet body.

4. The coupler as claimed in claim 1 comprising:

the bottom connector comprising a connector body and internal threads; and the internal threads being perimetrically disposed in the connector body.

5. A coupler comprising:

a main body;

a grab ring;

the main body comprising a central port, a top surface, a bottom head, a bottom connector, an inlet port, an outlet port, and a plurality of distribution channels;

the central port traversing from the top surface to the bottom head;

the bottom connector being terminally connected to the bottom head;

the inlet port being terminally connected to the central port;

the inlet port positioned perpendicular to the central port, adjacent to the top surface;

the grab ring being slidably engaged with the inlet port;

the outlet port being terminally connected to the central port;

the outlet port positioned opposite to the inlet port;

the plurality of distribution channels comprising a first channel, a second channel, a third channel, and a fourth channel;

the first channel being in communication with the second channel;

the first channel traversing from the inlet port to the central port;

the second channel traversing from the first channel to the bottom head;

the third channel being in communication with the fourth channel;

the third channel traversing from the outlet port to the central port;

the third channel not intersecting the first channel;

the fourth channel traversing from the third channel to the bottom head;

the inlet port comprising an inlet body, an inlet opening, an annular flange, and a plurality of retainers;

the inlet body extending outward from the central port to the inlet opening;

the inlet opening being in communication with the first channel;

the annular flange being connected adjacent to the inlet opening;

the plurality of retainers being perimetrically distributed about the inlet body;

the outlet port comprising an outlet body, an outlet connector, external threads, and an outlet opening;

the outlet body extending outward from the central port;

the outlet connector being terminally connected to the outlet body;

the external threads being perimetrically disposed about the outlet connector;

the outlet opening traversing axially inward from the outlet connector;

the outlet opening being in communication with the third channel;

the outlet opening comprising a first opening, a first diameter, a second opening, and a second diameter;

the first opening being conically shaped and in communication with the second opening;

the second opening being conically shaped and in communication with the third channel;

the first diameter of the first opening being larger than the second diameter of the second opening;

the grab ring comprising an outer surface, a front side, a rear side, an inner opening, and a plurality of ridges;

the outer surface extending from the front side to the rear side;

the outer surface being circular in shape;

the plurality of ridges being perimetrically disposed about the outer surface;
the inner opening extending from the front side to the rear side; and
the inner opening being axially aligned with the outer surface.

6. The coupler as claimed in claim 5 comprising:
the inner opening comprising a threaded portion and an unthreaded portion;
the threaded portion being perimetrically disposed on the front side;
the unthreaded portion being disposed on the rear side; and
the unthreaded portion being defined by the annular flange and the inlet body.

7. The coupler as claimed in claim 5 comprising:
the bottom connector comprising a connector body and internal threads; and
the internal threads being perimetrically disposed in the connector body.

8. A coupler comprising:
a main body;
a grab ring;
the main body comprising a central port, a top surface, a bottom head, a bottom connector, an inlet port, an outlet port, and a plurality of distribution channels;
the central port traversing from the top surface to the bottom head;
the bottom connector being terminally connected to the bottom head;
the bottom connector comprising a connector body and internal threads;
the internal threads being perimetrically disposed in the connector body;
the inlet port being terminally connected to the central port;
the inlet port positioned perpendicular to the central port, adjacent to the top surface;
the grab ring being slidably engaged with the inlet port;
the outlet port being terminally connected to the central port;
the outlet port positioned opposite to the inlet port;
the plurality of distribution channels comprising a first channel, a second channel, a third channel, and a fourth channel;
the first channel being in communication with the second channel;
the first channel traversing from the inlet port to the central port;
the second channel traversing from the first channel to the bottom head;
the third channel being in communication with the fourth channel;
the third channel traversing from the outlet port to the central port;
the third channel not intersecting the first channel;
the fourth channel traversing from the third channel to the bottom head;
the inlet port comprising an inlet body, an inlet opening, an annular flange, and a plurality of retainers;
the inlet body extending outward from the central port to the inlet opening;
the inlet opening being in communication with the first channel;
the annular flange being connected adjacent to the inlet opening;
the plurality of retainers being perimetrically distributed about the inlet body;
the outlet port comprising an outlet body, an outlet connector, external threads, and an outlet opening;
the outlet body extending outward from the central port;
the outlet connector being terminally connected to the outlet body;
the external threads being perimetrically disposed about the outlet connector;
the outlet opening traversing axially inward from the outlet connector;
the outlet opening being in communication with the third channel;
the outlet opening comprising a first opening, a first diameter, a second opening, and a second diameter;
the first opening being conically shaped and in communication with the second opening;
the second opening being conically shaped and in communication with the third channel;
the first diameter of the first opening being larger than the second diameter of the second opening;
the grab ring comprising an outer surface, a front side, a rear side, an inner opening, and a plurality of ridges;
the outer surface extending from the front side to the rear side;
the outer surface being circular in shape;
the plurality of ridges being perimetrically disposed about the outer surface;
the inner opening extending from the front side to the rear side; and
the inner opening being axially aligned with the outer surface.

9. The coupler as claimed in claim 8 comprising:
the inner opening comprising a threaded portion and an unthreaded portion;
the threaded portion being perimetrically disposed on the front side;
the unthreaded portion being disposed on the rear side; and
the unthreaded portion being defined by the annular flange and the inlet body.

\* \* \* \* \*